United States Patent [19]
Kessen et al.

[11] Patent Number: 5,822,859
[45] Date of Patent: Oct. 20, 1998

[54] BEARING WITH INTEGRALLY RETAINED SEPARABLE RACE

[75] Inventors: Jeffrey Steven Kessen, Huron; Debbie Sue Wadsworth-Dubbert, Port Clinton, both of Ohio

[73] Assignee: General Motors Corporation, Detroit, Mich.

[21] Appl. No.: 723,452

[22] Filed: Oct. 7, 1996

[51] Int. Cl.[6] ............................................ B23P 15/00
[52] U.S. Cl. .............................. 29/898.061; 29/898.062; 29/898.07; 29/509
[58] Field of Search ..................... 29/898.061, 898.062, 29/898.07, 724, 437, 509, 513; 384/537, 513

[56] References Cited

U.S. PATENT DOCUMENTS

| | | | |
|---|---|---|---|
| 4,179,167 | 12/1979 | Lura et al. | 308/189 |
| 4,958,944 | 9/1990 | Hofmann et al. | 384/512 |
| 4,986,607 | 1/1991 | Hofmann et al. | 301/124 |
| 5,061,090 | 10/1991 | Kriaski et al. | 384/537 |
| 5,226,738 | 7/1993 | Valette et al. | 384/513 |
| 5,240,333 | 8/1993 | Hassiotis et al. | 384/448 |
| 5,490,732 | 2/1996 | Hofmann et al. | 384/537 |
| 5,536,075 | 7/1996 | Bertetti | 301/105.1 |
| 5,596,798 | 1/1997 | Hofmann et al. | 29/898.07 |

Primary Examiner—Larry I. Schwartz
Assistant Examiner—Marc W. Butler
Attorney, Agent, or Firm—Patrick M. Griffin

[57] ABSTRACT

An improved method for retaining a separable bearing race to a inner bearing member by rolling over a deformable lip of the inner bearing member into a race abutting bead. The outer edge and inner surface of the separable race are cut away partially by a shallow, continuous, conical relieved portion with sufficient length and radial thickness to accommodate the degree of material swelling just inside of the race that results from the lip deformation process. Consequently, the swelled material does not bind unevenly on or stress the race, which maintains solid and secure contact with the inner bearing member.

3 Claims, 4 Drawing Sheets

BEARING WITH INTEGRALLY RETAINED SEPARABLE RACE

TECHNICAL FILED

This invention relates to methods of bearing manufacture and assembly, and specifically to a two row ball bearing of the type in which a separable race is integrally retained to a central spindle with improved continuity of supporting contact between the race and spindle.

BACKGROUND OF THE INVENTION

Bearings in which an inner race or spindle is supported within a surrounding outer race or hub by two axially spaced rows of rolling elements provide superior axial stiffness and load support. As a consequence, they are almost universally used for automotive wheel bearings, driven or non driven. The two rows of rolling elements are most often bearing balls, in modern designs, with convergent, angular contact pathways.

The manufacturer of two row ball bearings that support heavy loads must deal with the issue of retaining at least one separable ball race to the spindle. This is because, while it is simple to load a full complement of balls into the first row, the second row will have to have one pathway that is axially removable. Otherwise, the second row would have to be loaded with a technique such as radially displacing the spindle and hub and then loading the balls into the locally widened space so created. This allows for only a less than full complement of balls in the last installed ball row, which would drastically reduce load capacity. With a separable race, a full ball complement is achieved, but two other issues must be dealt with. The separable race must be installed so as to maintain a proper bearing preload or endplay and must be securely retained axially to the end of the spindle. In some older methods of assembly, both considerations are handled by the same structure. For example, a simple threaded nut can be torqued down against the separable race, pushing it axially against its ball row until the proper bearing preload is achieved. If the nut can be prevented from backing off by an adequate locking means, it both maintains the preload and retains the race. Nut locking is difficult to assure, however.

A more accurate and secure, if more complex system is disclosed in co assigned U.S. Pat. No. 4,179,167 issued Dec. 18, 1979 to Lura et al. A separable race slides onto the outer surface of the spindle freely until it hits the outer ball row. As it makes contact with the outer ball row, its outer edge rests past the inner wall of a groove machined into the spindle. The separable race is forced and held against its ball row by an assembly apparatus to the desired preload, and then the axial spacing of its outer edge from the outer wall of the groove is accurately gauged. Then, a pair of selected thickness keeper rings, chosen from a pre-machined assortment, are tightly inserted between the outer edge of the separable race and the far wall of the spindle groove. The keeper rings hold the proper race location and so maintain the preload or end play as desired. Finally, a sleeve shaped retaining ring must be swaged down over the keeper rings to hold them radially down into the groove to. While this assembly method has proved a solid and robust design for years, a less costly system, in terms of parts, assembly steps, or both, would be very desirable, if it could provide the same preload accuracy and durability.

The simplest possible separable race retention system, at least in terms of total parts, would be one that used some portion of the spindle material itself to retain the separable race, instead of a separate component, such as a nut or keeper rings. A process that has received a good deal of attention in patents worldwide is the so called cold forming or "riveting" process, in which a cylindrical lip on the end of the spindle is cold formed axially inwardly and radially outwardly into an annular bead that abuts the outer edge of the separable race. How solidly and securely the separable race is retained to the spindle is a function not only of the contact between the bead and the outer edge of the race, but also a function of the continuity of contact between the inner, mounting surface of the separable race and the outer, support surface of the spindle. Their mutual contact interface should be both tight and continuous, that is, with no radial gap. However, deforming a lip of the spindle radially outwardly has the same effect on the outer surface of the spindle that heading over a rivet has on the outer surface of the rivet. The outer surfaces of both tend to swell radially outwardly, since material deformed in one direction must show up somewhere else. The swelling is concentrated nearest the deformed bead.

Because of the radial swelling problem, the "riveting" process has met with varying degrees of success, depending on the type and size of bearing involved. In the case of small, relatively lightly loaded bearings, such as those that support a shaft in a hand held electric power tool, the riveting process is easy to apply. This is because the radial thickness of the lip and the degree to which it must be worked over the edge of the race to form a bead can both be relatively small. Consequently, the degree of radial outward swelling that the cylindrical outer surface of the spindle (inner race) experiences will be correspondingly small. However, with larger, heavily loaded wheel bearings, the deformable lips must be longer or thicker, or both, and must be deformed axially inwardly (and radially outwardly) to a greater degree, in order to form a bead of adequate size and strength. Consequently, the cylindrical outer surface of the spindle swells radially outwardly more as the lip is formed in and over, especially nearest the concave inner corner of the bead. An analogy would be bending a thin metal sheet into a 90 degree corner, as compared to bending a thick metal sheet the same way. The thick metal sheet will not form a sharp, neat corner, because of its extra thickness.

Figure 1:
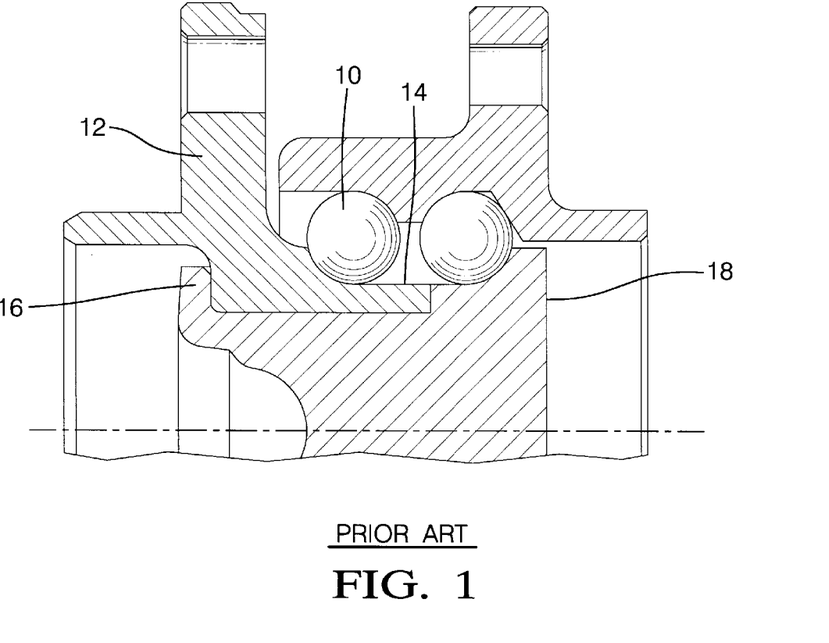
FIG. 1 is a cross section through a bearing made according to the technique described above, with the large, multi purpose separable race.

Prior patents that disclose different "riveting" structures and methods in the wheel bearing environment appear to recognize the swelling problem and deal with it in various ways, none of which are universally applicable, and all of which have various shortcomings. A good example may be seen in U.S. Pat. No. 5,226,738 issued Jul. 13, 1993 to Valette et al, the main embodiment of which is redrawn in FIG. 1 of the attached drawings. Although not absolutely clear, the patent refers to the deformed bead as a "collar" and says that "pressing and forging forces produced during the process of making the collar generate deformations of the bearing ring." Presumably, that refers to the radial outward swelling of the spindle, which presses outward on the overlaying "ring" (separable race). The proposed solution to that deformation problem is not one that is applicable in most situations. As seen in FIG. 1, what is proposed is to make the last installed ball row 10 (the ball row which needs the separable race) the outboard row, rather than the inboard row, thereby locating it axially near the large wheel attaching flange 12. Generally, as in the Lura design described above, the situation is the reverse, and the last installed ball row and its separable race are inboard, and axially remote from the wheel flange. Putting the last installed ball row 10 near the wheel flange 12 allows its pathway 14 to be integrated in one piece with the wheel flange 12. Generally, the pathway 14 would be part of a much smaller ring, which would be large enough to provide nothing but the pathway, and, often, a seal running surface. In addition, the deformed bead or "collar" 16 is moved to the opposite, outboard end of the spindle 18, which is hollowed out in order to make the bead 16. Usually, the outboard end of the spindle, which is where the wheel flange is formed, is solid. What these design changes accomplish is to axially align the bead 16 with the wheel flange 12, which is very stiff, in the radial direction. Then, when the bead 16 is formed, the stiffness of the wheel flange 12 can, so it is claimed, resist the radially outward swelling of the outer surface of spindle 18 near the bead 16, thereby preventing deformation of the pathway 14. Coincidentally, or perhaps intentionally, incorporating the pathway 14 and wheel flange 12 into one, longer piece puts much more surface area in contact with the outer surface of the spindle 18. Consequently, local deformation of the outer surface of spindle 18 near the bead 16 would be much less likely to disturb the overall continuity of contact between the mating surfaces. Another patent that shows the separable race integrated with the wheel mounting flange is U.S. Pat. No. 4,986,607 issued Jan. 22, 1991 to Hofmann et al.

As noted, it is much more common for the pathway of the last installed ball row to be part of a separable ring that does nothing more than provide the ball pathway, and which does not include a wheel mounting flange or any other structure that provides a separate function. Even with a pathway only race, some patented designs propose to substantially axially lengthen and radially thicken the race. This serves to move the outer edge of the separable race axially away from the ball pathway and also radially thickens it considerably, as compared to a race that is no thicker than the pathway only would require. It also provides much more length for and inner surface area on the cylindrical inner mounting surface of separable race, with more potential supporting contact on the outer surface of the spindle or inner race. Examples may be seen in U.S. Pat. No. 4,958,944 issued Sep. 25, 1990 to Hoffman et al. The separable race ring 3 is machined with three axially extended, progressively radially thicker steps 5, 6 and 7, which are intended to absorb the deformation forces, and thereby isolate and protect the ball pathway. Likewise, U.S. Pat. No. 5,240,333 issued Aug. 31, 1993 to Hassiotis et al. provides a cylindrical extension 6 to move the race outer edge away from the pathway. A distinctively different approach shown in U.S. Pat. No. 5,536,075 issued Jul. 16, 1996 to Bertetti actually adds a deformable cylindrical lip to the separable race itself, instead of on the inner spindle, and deforms it radially inwardly, rather than outwardly, and down into a groove in the inner bearing member. However, it would be very difficult to hold and assure a proper ball row preload with such a system, since the deformation is being applied very directly to the race. All of these approaches serve to lengthen, thicken, and increase the mass of the separable race, which would be considered unacceptable in most cases. In addition to the extra mass in the race, the entire spindle and bearing would have to be lengthened to accommodate it, with an accompanying weight and cost penalty in the whole bearing.

Figure 2:
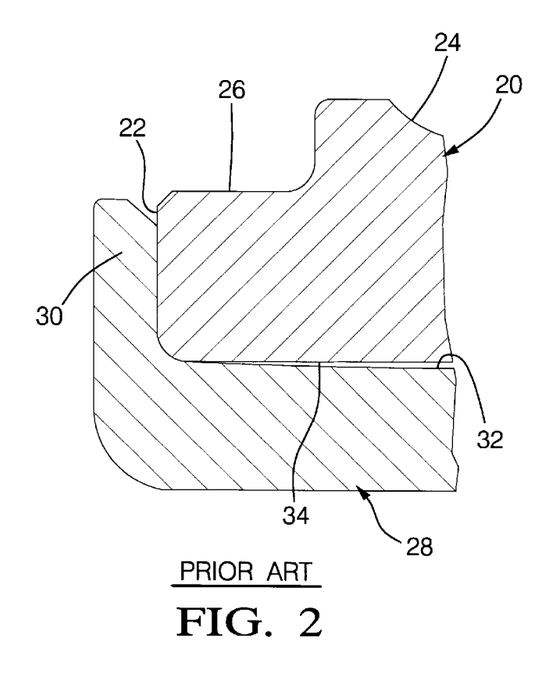
FIG. 2 is a cross section through a conventionally sized, single purpose separable race and its accompanying retention bead, illustrating the result of radial swelling.

Far more common and practical is a separable race such as that shown at 20 in FIG. 2, which is made as axially and radially compact as possible. Such a race incorporates no more steel, or weight, than is absolutely needed to provide an angular contact ball pathway. Consequently, the outer edge 22 is axially close to the ball pathway 24, and is no radially thicker than the shoulder of the pathway 24. In fact, the outer edge 22 may more often actually be machined down and made radially thinner, as shown, so as to provide a radially inset surface 26 for a seal or the like. Such a race 20 does not have nearly the strength to resist radially outward deforming forces that the thicker, longer and heavier races noted above would have. Moreover, when the end of spindle 28, typically the inboard end, is headed over into a bead 30 pressed against the race outer edge 22, those forces are much nearer to the pathway 24. As the bead 30 is formed, the spindle's cylindrical outer surface 32 swells radially outwardly. This swelling is not evenly distributed, but is instead concentrated near the concave corner juncture with the bead 30. Therefore, the swelling pushes radially outwardly on the separable race 20, more so near the edge 22, binding unevenly against the cylindrical inner mounting surface 34 of race 20. This binding can be so great as to create the kind of radial gap shown between the surfaces 32 and 34, although it might not be clearly visible. The solidity and security of the attachment of separable race 20, its ability to take and transfer loading and its resistance to rotation on spindle 28, depends on avoiding such a gap, and on holding the continuity of contact at the interface between the mating cylindrical surfaces 32 and 34. Finite element analysis of the situation has shown that a visible gap between the surfaces 32 and 34 does in fact appear.

The most current proposed solution to this problem is a very narrow and specific design disclosed in the recently issued U.S. Pat. No. 5,490,732 issued Feb. 13, 1996 to Hoffman et al, assigned to the same company that filed the patents on many of the heavy, strengthened race designs described above. Some of those earlier patents have been allowed to lapse, a telling indication that it is the smaller, lighter separable races that are actually commercially feasible. What is proposed in U.S. Pat. No. 5,490,732, instead of modifying the race, is to specify an extremely detailed set of parameters for the deformable lip, and particularly for the final outer shape of the bead formed therefrom. As to the final bead shape, the angle of its inner surface, angle face surface, and the radius of transition between those two surfaces are specified. A claim that the final outward shape of the bead would somehow improve the race retention is difficult to support, however. The outer surface of the bead, after all, does not even touch the race or spindle directly. Moreover, the outer shape of the bead, the angles of its outer surface, etc., would really be a function of the tooling used to form the bead, which is not even disclosed. Other tooling could, starting with the same initial lip, form a bead with a very different outer shape, but with no significant change in the bead strength or operation. Furthermore, as can be seen by comparing FIG. 3 of the Hoffman to the prior art shown FIG. 2 of the attached drawings, there really is, compared to the prior art, no discernible qualitative difference in the shape of the bead nor, assuming similar scale, any provable quantitative difference. No explanation is given of how or why a bead with a particular final outer shape would work any better or any differently. Nor would it, since the swelling inboard of the bead will occur regardless, and nothing is specified to really deal with that issue. In addition, tear down analysis of bearings apparently manufactured to the specifications of the patent has shown that the dimensions of the separable race, though not set out in the patent, are in fact larger than those used in the subject invention. The robustness of the race may really account for any success of the design. Specifically, the axial length of the race, at about 25 mm, and the radial thickness of the race, at about 10 mm, are both significantly greater than for the race installed as per the subject invention, described in greater detail below. A particular outward bead shape may have been mistakenly concluded to be a cause of success when it was no more than a coincidental effect, while the unseen effect of a more robust separable race was overlooked. While greater axial length and radial thickness in the race will surely resist swelling and deformation, they add weight and cost. In sum, the design as shown would actually be very difficult to copy and practice in such detail, absent a disclosure of the tooling, and it is doubtful that a designer would even wish to copy it, lacking a clear explication or proof of its viability.

SUMMARY OF THE INVENTION

The invention provides a method for retaining a compact and light weight separable race to a spindle, with a conventionally headed over lip and formed bead. The results of the typical deformation process have been analyzed, and the separable race has been slightly modified so as to better accommodate the conventional lip deformation process. The modification made to the separable race is simple, and actually serves to lighten it.

The process disclosed recognizes how the radial swelling incident to bead deformation works, and where it occurs, and slightly modifies the separable race so as to work in cooperation with that process. Specifically, a deformable annular lip of conventional thickness and shape is provided on the end of the spindle. A shoulder is machined on the spindle to abut the inner edge of the separable race while leaving a conventional length of the lip "unsupported," that is, extending axially past the race outer edge, which is later deformed into a bead. The axial distance over which radial swelling in the outer surface of the spindle will occur when the lip is so headed over is determined. Then, the outer edge of the inner race is provided with a shallow conical relieved surface that extends axially inwardly into the inner, cylindrical mounting surface of the race by approximately that axial distance. The unrelieved remainder of the race inner surface, though axially shortened, makes a tight press fit with the outer surface of the spindle. When the bearing is assembled, the separable race is installed by a tight press fit onto the spindle and against the shoulder, and its pathway is ground and carefully gauged in the installed position, then removed again. The proper size balls for the separable race are chosen based on that gauging to assure the proper preload or axial endplay in the fully assembled bearing. Then, the bearing is assembled, outboard ball row first, followed by the inboard ball row. The separable race is again press fitted tightly onto and over the end of the spindle, tight to the stop shoulder, thereby assuring the proper preload against the second installed, inboard ball row. The unsupported, remaining length of the lip is then conventionally headed over, pressed and rolled axially inwardly and radially outwardly over the separable race's outer edge into a retaining bead. However, the axially inward force of the bead against the race outer edge is resisted by the spindle shoulder, and is not used to create the ball preload. Most importantly, the relieved portion of the separable race serves to accommodate and in effect mold and form the spindle material that swells radially outwardly during the bead formation process. This assures the continuity of the tight press fit between the race mounting surface and spindle's race supporting surface. Because the continuity of contact between those two surfaces is preserved, with essentially no radial gap, the separable race is protected against axial or radial stress, maintained at the proper preload, and resists rotating on the spindle.

BRIEF DESCRIPTION OF THE DRAWINGS

These and other objects of the invention will appear from the following written description, and from the drawings, in which.

DESCRIPTION OF THE PREFERRED EMBODIMENT

Figure 3:
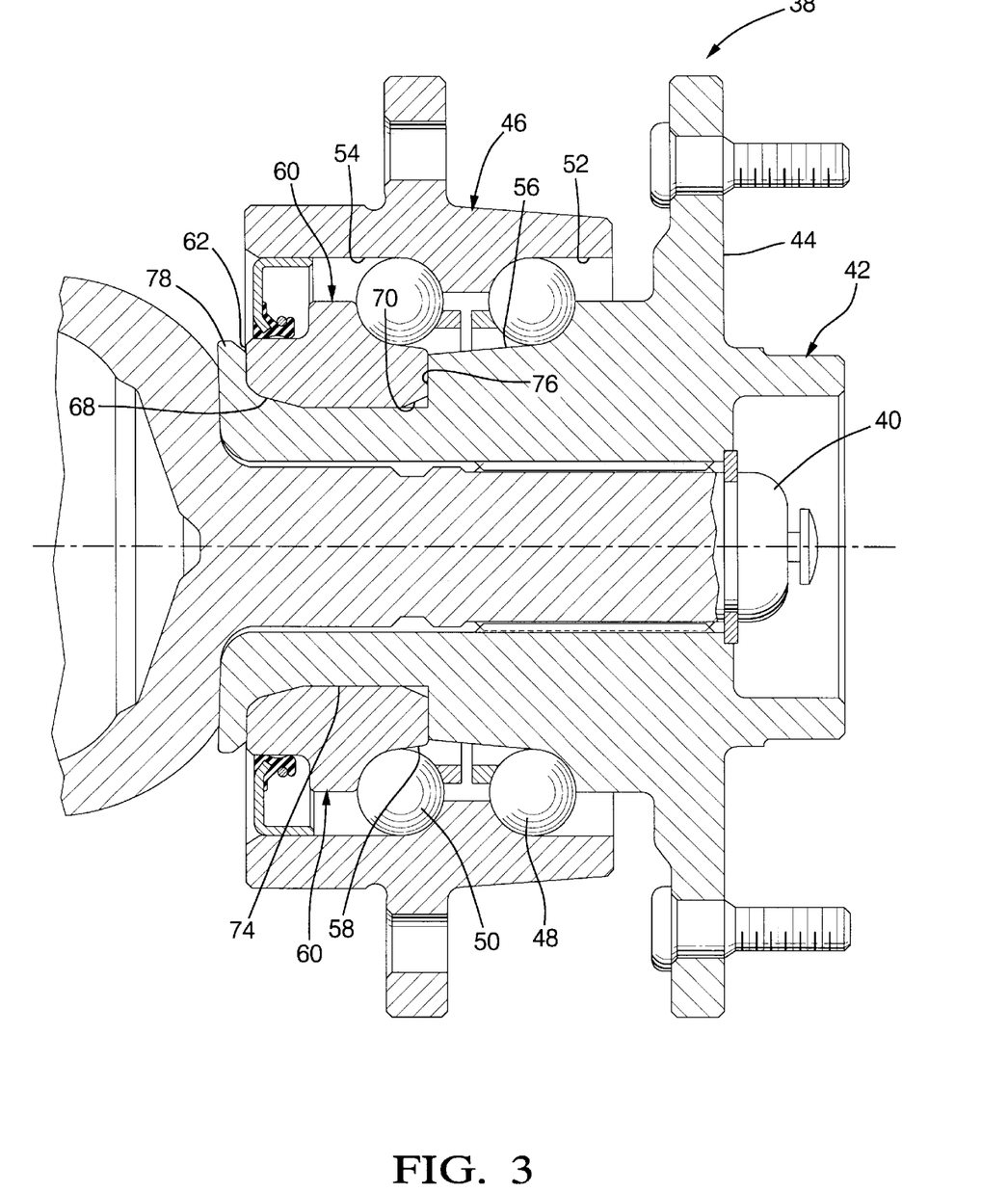
FIG. 3 is a cross section through a bearing made according to the invention.
Figure 4:
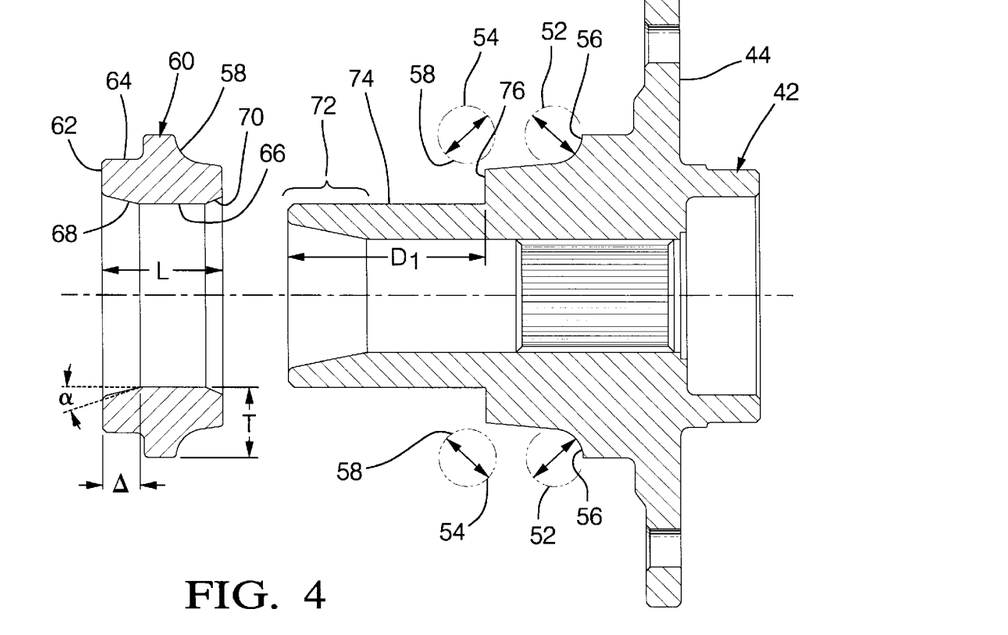
FIG. 4 shows the separable race removed from the spindle, with the spindle lip in an undeformed state and the separable race removed.

Referring first to FIGS. 3 and 4, a vehicle wheel bearing made according to the invention is indicated generally at 38. Bearing 38, as shown, is a driven bearing, meaning that a drive shaft 40 passes through it, specifically through the splined, hollow center of the inner race or "spindle", indicated generally at 42. However, it could just as easily be a non driven, trailing bearing. Either way it is spindle 42 that rotates and carries the wheel attachment flange 44 at its outboard end. The outer race or "hub", indicated generally at 46, is stationary and bolted to the non illustrated vehicle suspension. Two ball rows, an outboard ball row 48 and inboard ball row 50, are full complement and axially spaced apart, so as to provide good load support and axial stiffness. The ball rows 48 and 50 run on two pairs of convergent angular contact pathways. These are an outboard outer pathway 52 and inboard outer pathway 54, both ground integrally into hub 46, an outboard inner pathway 56, ground integrally into spindle 42, and an inboard inner pathway 58. Inboard inner pathway 58 is ground into a separable, generally ring shaped race, indicated generally at 60. Separable race 60 is only as axially long and as radially thick as is necessary just to provide the inboard inner pathway 58 for the last installed ball row 50. As disclosed, the axial length L is approximately 16 mm, and radial thickness T approximately 8 mm, significantly shorter, thinner, and lighter than the race noted above that was installed as per the U.S. Pat. No. 5,490,732. As a consequence, its outer edge 62 is closer to its pathway 58, little more than a ball diameter away. Furthermore, as is typical, race 60 is actually thinned down at edge 62 to provide a seal running surface 64, and so has even less ability to resist any radially outward forces acting near the outer edge 62. The inner surface 66 of race 60 is cylindrical, but for a shallow conical relieved portion 68, which cuts off some of the annular outer edge 62, and also a significant portion of the potential axial length of the inner surface 66. Specifically, conical relieved portion 68 has an axial length that extends over approximately a third of the total axial length L, a distance indicated at Δ, and at a shallow angle α (measured relative to a horizontal line parallel to the center line of race 60), both of which are based on considerations described below. The inner edge of race 60 is cut off slightly by a much sharper and shorter chamfer 70, which provides only a conventional clearance function described later.

Figure 5:
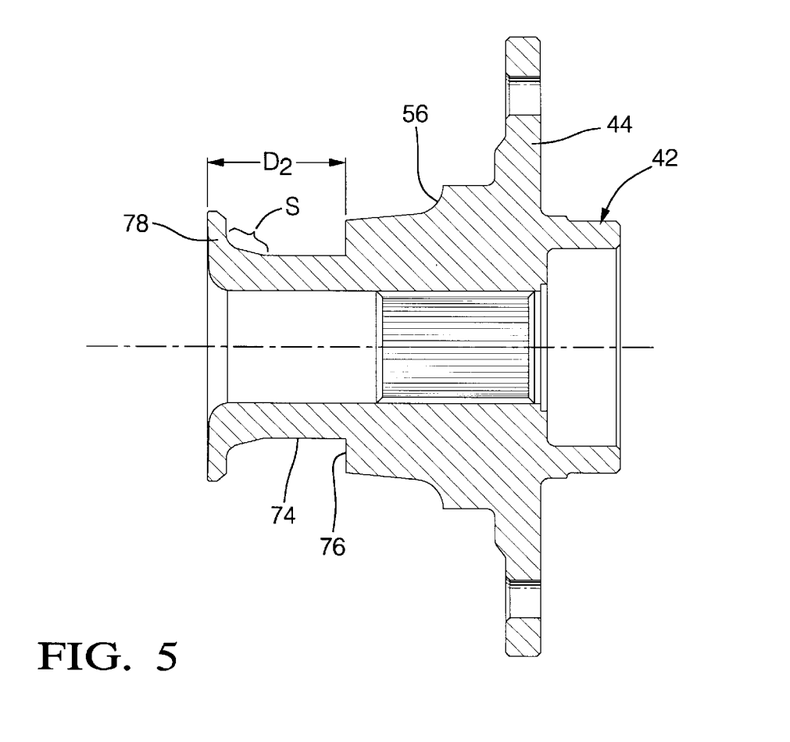
FIG. 5 shows the spindle with the lip deformed into a bead, but with the separable race removed to better illustrate the deformation that the spindle undergoes.

Referring next to FIGS. 4 and 5, spindle 42 is already hollow through the center, and is therefore easily provided with a deformable lip 72. Lip 72 is really just a sleeve like extension of the cylindrical support surface 74 of the hollow spindle 42, and therefore has the same diameter initially as surface 74, but really has no discrete, individual axial length per se. If the spindle were solid, as in a trailing bearing, then the lip would be formed by a central bore cut into the axially inner end of the spindle, and the lip would have a discrete, individual axial length. Lip 72 is also tapered slightly over its inner surface to make it more easily deformed. A stop shoulder 76 is machined perpendicular to spindle outer surface 74, and is located inboard of the integral outboard inner pathway 56. In FIG. 4, the installed, final position of the three other pathways, 52, 54 and 58 is indicated in dotted lines for comparison, and the contact angles therebetween are shown by double headed arrows. In its undeformed, initial state, lip 72 terminates at a distance $D_1$ from stop shoulder 76, which provides a convenient reference frame. In its deformed and "headed over" final state of FIG. 5, lip 72 has been formed into an annual bead 78 that terminates at a lesser distance $D_2$ from shoulder 76. Now, it should be kept in mind that spindle 42 and bead 78 never actually exist as shown in FIG. 5, and could not, in the absence of the separable race 60. Race 60 is removed in FIG. 5 simply for ease of illustration. The actual values of $D_1$ and $D_2$ will vary from case to as case, as will their differential, dependent on how thick lip 72 initially is, how thick and how wide the bead 78 must be to retain race 60, and the particular tooling used to create bead 78. Still, the difference between $D_1$ and $D_2$ is a good indication of the degree to which lip 72 is axially deformed in the process of forming bead 78. The axial degree of deformation so determined, in turn, affects the degree to which the spindle support surface 74 will swell radially outwardly, and how far back from the inside corner of the bead 78 the effects of swelling will appear. The swelled out area is indicated at "S" in FIG. 5, where it is shown as having a generally conical configuration. However, if lip 72 were simply headed over in the absence of some solid guiding or "molding" structure surrounding the surface 74, it would not swell out into such an even or symmetrical shape as shown. In any event, the degree of swelling will be greatest nearest the bead 78, and will drop off moving axially inwardly from there, generally as shown. While the degree of swelling will vary and will have to be determined empirically from case to case, the general objective of the invention is to provide the race 60 with a conical relieved portion 68 that has an axial length $\Delta$ approximately equal to the difference between $D_1$ and $D_2$, so as to be capable of axially accommodating the swelled area "S" The relieved portion is also given a continuous, shallow angle $\alpha$ just sufficient to radially accommodate the same outwardly swelled material. Another aspect of the method of the invention is that the outer diameter of the spindle's cylindrical support surface 74 and the inner diameter of the separable race's cylindrical mounting surface 66 are very close, close enough to make a very tight interference fit, for purposes described further below.

Referring again to FIG. 4, before the final assembly of bearing 38, separable race 60 is initially and temporarily press fitted tightly onto and over the inboard end of spindle 42 until its inner edge abuts the stop shoulder 76. The interference fit between the race mounting surface 66 and spindle support surface 74 is so tight that a fairly powerful ram apparatus, or alternate chilling and heating of the respective parts, or some combination thereof, would be necessary to carry out the initial installation. Then, both inner pathways 56 and 58 are ground at once, as if the spindle 42 and race 60 were one integral part. Concurrently, both outer pathways 54 and 52 are ground into hub 46. Before separable race 60 is removed again, the ground pathways 56 and 58 are gauged relative to a standard reference frame, as are the pathways 52 and 54 on hub 46. Then, suitable size balls 48 and 50 are chosen so as to fit up between the opposed pathways 52–56 and 54–58 respectively with the desired axial preload or end play. The nominal ball diameter here is 11.11 mm, but that may vary up or down from bearing to bearing, depending on how the pathways gauge out. Then, race 60 is removed with a suitable pulling apparatus. Next, the outboard ball row 48 is installed against the outboard inner pathway 56 of spindle 42, and hub 40 is moved freely over spindle 42 until its outboard pathway 52 hits the outboard ball row 48. There is no problem in making the outboard ball row 48 a full complement, of course, because there are no physical barriers to free ball entry. Then, the full complement inboard ball row 50 is installed against the inboard ball pathway 54 of hub 46 which is possible since the separable race 60 is not yet installed or in the way. Next, the separable race 60 is reinstalled, making the same tight press fit over the spindle support surface 74, and pushed with the same ram apparatus (or other technique) until it abuts stop shoulder 76. The sharp chamfer 70 on the inner edge of race 60 assures a good, flat to flat contact with the stop shoulder 76. At this point, because of the tight press fit of race 60, the desired preload or axial end play is created, based on the grinding, gauging, and ball selection steps already carried out. It remains only to assure that race 60 is axially retained to spindle 42 and snug against stop shoulder 76 without jeopardizing the close, continuous press fit of the two surfaces 74 and 66.

Figure 6:
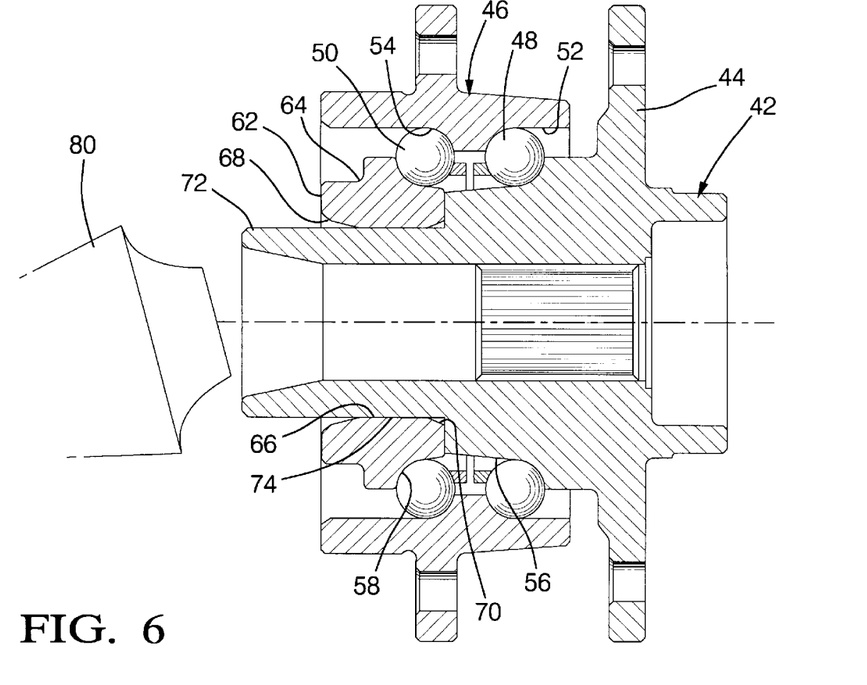
FIG. 6 shows the bearing assembled, just prior to the deformation of the lip.
Figure 7:
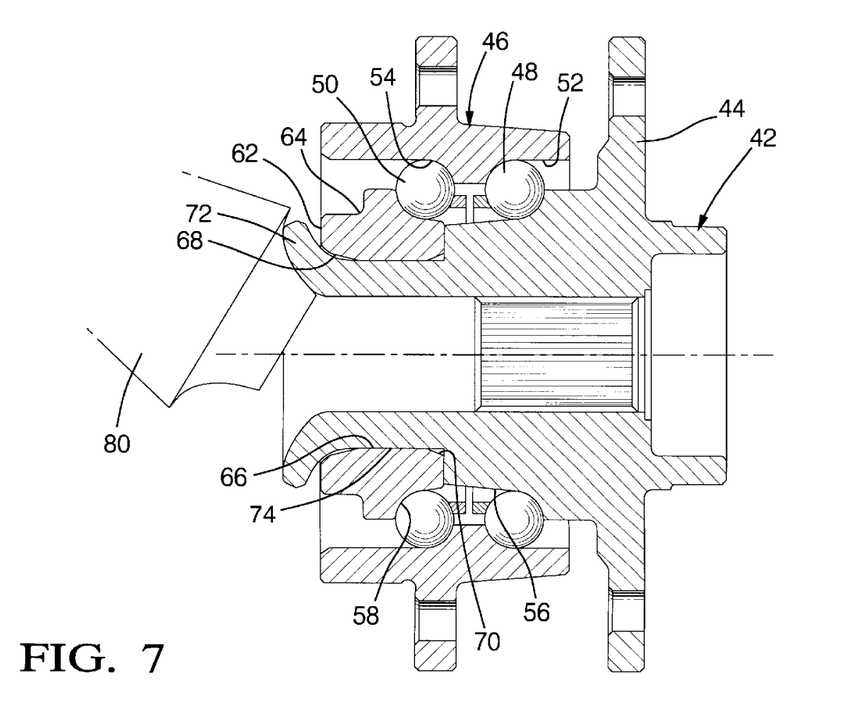
FIG. 7 shows the lip in the process of being deformed.

Referring next to FIGS. 6 and 7, the retention of race 60 is achieved by "heading over" or roll forming the lip 72 with the conventional roll forming tool shown at 80, which is rocked or "orbited" around the centerline of bearing 38 and pushed down forcefully at the same time. Bearing 38 and spindle 42 are supported in a non illustrated solid base during this operation. Concurrently, lip 72 is forced axially inwardly and rolled radially outwardly, gradually deforming it into the bead 78 described above. Lip 72 need not have any particular radial thickness, hardness, taper angle, or unsupported length to start. Lip 72 simply needs enough unsupported material extending past the race outer edge 62 (and enough radial thickness) to allow it to be deformed into a bead 78 with sufficient strength and radial width to axially retain race 60. That would be true for any lip deformed into a race retaining bead, and the exact dimensions needed will vary from case to case. While bead 78 must conform closely to the race outer edge 62 and cover almost all of its radial width to give good retention, it need not be forced against the race outer edge 62 with any particular pressure, since it is not intended to establish bearing preload, in the way that a tightened retention nut might. That preload is already set, and bead 78 simply provides axial retention. Any axial force it did apply to race 60 would be absorbed through the stop shoulder 76, and not directly through the ball rows. Also, the bead 78 formed from lip 72 need not have any particular outer surface shape. As shown, the inner surface of bead 78 has no angle relative to the center line, the outer face of bead 78 is simply flat, with no angle relative to vertical. What is important is not the outer surface shape of bead 78, but the fact that the material behind bead 78 that swells radially outwardly is accommodated within the race conical relieved portion 68. That relieved portion acts as a reservoir to accommodate the displaced material and also serves to mold it into a smooth, symmetrical conical shape, tapering gradually with no abrupt change in angle or slope that could cause stress concentration. Ideally, the material that does swell out from the spindle surface 74, near the bead 78, will engage and contact the inner surface of the conical portion 68 as tightly as the two surfaces 74 and 66 contact one another, but not so tightly as to create a radial gap, as in the prior art. As noted above, the degree of deformation of lip 72 involved in creating a bead 78 can be quantified fairly well by the differential between $D_1$ and $D_2$, in any particular case. The race conical portion 68, as noted, is given a length $\Delta$ approximately equal to that differential, or about a third of the total race length in the particular embodiment disclosed. The shallow angle $\Delta$ is just sufficient to accommodate the expected swelling. That angle can't be absolutely quantified for every situation, and would be empirically determined based on the lip deformation and thickness, etc., in any given case, and based on the radial swelling attendant upon the formation of bead 78 therefrom. However, $\alpha$ will definitely be shallow in any case. For example, testing showed that 7 degrees was ideal, creating the kind of desired tight contact without binding described above, but 15 degrees was too great, leaving a small gap. A range for $\alpha$ of five to ten degrees should be effective in most cases. In any event, $\alpha$ will be so shallow as to have no significant effect on the axial retention of race 60 per se, nor is it intended to. That is, the surface of relieved portion 68 is too shallow to provide any significant resistance to an axial pull off force.

Retention is provided entirely by the right angle inner face of bead 78 that closely abuts the race outer edge 62.

Figure 8:
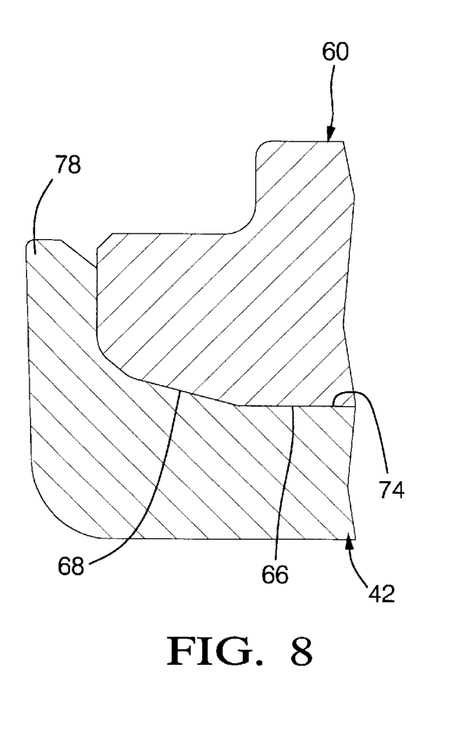
FIG. 8 is an enlarged cross section of the outer edge of the separable race and the deformed bead.

Referring next to FIGS. 2 and 8, which are placed side by side for ease of comparison, a visual representation of the improved performance of the invention may be seen. There is now tight, continuous, intimate contact between the surfaces 74 and 66, as compared to the gap between the equivalent surfaces 32 and 34 in the prior art. The beads 30 and 78, on the other hand, are basically equivalent in size and shape, and formed in the same way. Likewise, the races 20 and 60 are essentially equivalent in terms of axial length and radial width, differing significantly only in the conical portion 68 and in the solidity of contact with the spindle support surface 74. One difference in the bead 78, as compared to 30, is not visually obvious, but a computer finite element analysis printed out with differing colors to indicate differing strain levels showed clearly that the levels of greatest strain hardening in the bead 78 were much less localized than in the bead 30. Strain was not as concentrated near the corner bend in the bead 78. Rather, the strain was distributed more consistently and farther back into the spindle 42 itself, wrapping around past the conical portion 68. This makes for a more durable, less brittle retaining bead 78. In effect, the corner of the bead 78 was not forced to bend as sharply. The better contact between the cylindrical surfaces 74 and 66, with no unsupported gap, means that there is less residual stress in race 60, better resistance to rotation of race 60 on spindle 42, and much less tendency toward cracking or breaking. These advantages are achieved with no specific limitations or changes in the way lip 72 is initially configured or deformed into bead 78. No weight or size increasing structural changes are made to race 60, apart from the conical portion 68 which can be easily and cheaply ground in when race 60 is formed. In fact, the weight of race 60 would be somewhat reduced thereby.

Variations in the embodiment disclosed could be made. For example, if the axial force of the bead 78 against the race outer edge 62 could be controlled adequately, it could be used to create the bearing preload and set the axial end play, without the use of the stop shoulder 76 and without the pathway gauging and ball size selection steps outlined above. Other patented designs claim to do just that. However, without an adequate assurance of good retention of the race by the bead, it would be difficult to set the preload properly or maintain it accurately. Other lip initial shapes and bead final shapes could be utilized because, as noted, those factors are not particularly significant to the adequacy of race retention, once a sufficiently thick and wide bead is provided. It is the accommodation of the inevitable radial swelling attendant upon lip deformation that is important. Therefore, it will be understood that it is not intended to limit the invention to just the embodiment disclosed.

It is claimed:

1. A method for assembling a bearing of the type having an inner spindle, a surrounding outer hub, a pair of axially spaced rows of rolling bodies supporting said spindle and hub for coaxial rotation, with one of said rows running on a pathway of a generally ring shaped separable race having a cylindrical mounting surface that press fits tightly over a cylindrical support surface on said spindle in an installed position, said race having an axial outermost edge that is axially proximate to said pathway and limited in radial thickness to substantially the radial thickness of said pathway, said method comprising the steps of;

providing a radially outwardly and axially inwardly deformable annular lip on said spindle axial end having an outer diameter initially equal to said spindle support surface, providing said race outer edge and mounting surface with a generally conical relieved portion, said relieved portion having an axial length and a continuous, shallow angle sufficient to accommodate radially outward swelling experienced by said spindle support surface as said annular lip is deformed, installing said separable race over said spindle with said race mounting surface and spindle support surface tightly and closely engaged and with said annular lip extending axially beyond said race outer edge, and, deforming said spindle annular lip axially inwardly and radially outwardly sufficiently to form a bead closely abutting said race outermost edge to retain said race to said spindle, said race relieved portion accommodating the resultant radially outward swelling in said spindle support surface, thereby preventing uneven binding against said race mounting surface and maintaining a solid engagement between said support surface and mounting surface.

2. A method for assembling a bearing of the type having an inner spindle, a surrounding outer hub, a pair of axially spaced rows of rolling bodies supporting said spindle and hub for coaxial rotation, with one of said rows running on a pathway of a generally ring shaped separable race having a cylindrical mounting surface that press fits tightly over a cylindrical support surface on said spindle in an installed position, said race having an axial outermost edge that is axially proximate to said pathway and limited in radial thickness to substantially the radial thickness of said pathway, said method comprising the steps of;

providing a radially outwardly and axially inwardly deformable annular lip on said spindle axial end having an outer diameter initially equal to said spindle support surface, determining the degree to which deformation of said lip into an axially inwardly and radially outwardly to form a race retention bead will axially and radially effect said spindle support surface by causing radially outward swelling thereof;

providing said race outer edge and mounting surface with a generally conical relieved portion said relieved portion having an axial length and a continuous, shallow angle matched to said determined axial and radial effect on said spindle support surface, installing said separable race over said spindle with said race mounting surface and spindle support surface tightly and closely engaged and with said annular lip extending axially beyond said race outer edge, and, deforming said spindle annular lip axially inwardly and radially outwardly sufficiently to form a bead closely abutting said race outermost edge to retain said race to said spindle, said race relieved portion accommodating the resultant radially outward swelling in said spindle support surface, thereby preventing uneven binding against said race mounting surface and maintaining a solid engagement between said support surface and mounting surface.

3. A method for assembling a bearing of the type having an inner spindle, a surrounding outer hub, a pair of axially spaced rows of rolling bodies supporting said spindle and hub for coaxial rotation, with one of said rows running on a pathway of a generally ring shaped separable race having a cylindrical mounting surface that press fits tightly over a cylindrical support surface on said spindle in an installed position, said race having an axial outermost edge that is axially proximate to said pathway and limited in radial thickness to substantially the radial thickness of said pathway, said method comprising the steps of;

providing a radially outwardly and axially inwardly deformable annular lip on said spindle axial end having an outer diameter initially equal to said spindle support surface, machining a stop shoulder on said spindle axially inset from said annular lip sufficiently to allow said race to be abutted therewith and with its outermost edge axially inset from said annular lip, providing said race outer edge and mounting surface with a generally conical relieved portion, said relieved portion having an axial length and a continuous, shallow angle sufficient to accommodate radially outward swelling experienced by said spindle support surface as said annular lip is deformed, installing the proper size rolling bodies between said spindle and hub to provide the proper preload, installing said separable race over said spindle and into abutment with said stop shoulder with said race mounting surface and spindle support surface tightly and closely engaged and with said annular lip extending axially beyond said race outer edge, and, deforming said spindle annular lip axially inwardly and radially outwardly sufficiently to form a bead closely abutting said race outermost edge to retain said race to said spindle, said race relieved portion accommodating the resultant radially outward swelling in said spindle support surface, thereby preventing uneven binding against said race mounting surface and maintaining a solid engagement between said support surface and mounting surface.

* * * * *